United States Patent
Markowski et al.

[11] 3,880,041
[45] Apr. 29, 1975

[54] RESILIENT FASTENER

[75] Inventors: Edwin P. Markowski, Medfield; Jerome S. Pepi, Chelmsford, both of Mass.

[73] Assignee: Barry Wright Corporation, Watertown, Mass.

[22] Filed: Mar. 19, 1973

[21] Appl. No.: 342,850

[52] U.S. Cl............................ 85/70; 85/32 CS
[51] Int. Cl............................... F16b 13/06
[58] Field of Search............ 85/32 CS, 70, 71, 82; 248/21, 24, 8

[56] References Cited
UNITED STATES PATENTS

| | | | |
|---|---|---|---|
| 1,419,979 | 6/1922 | Ogden | 85/70 |
| 1,933,555 | 11/1933 | Jasper | 85/32 CS |
| 2,363,663 | 11/1944 | Findley | 85/70 |
| 2,525,736 | 10/1950 | Taylor | 85/70 |
| 2,557,610 | 6/1951 | Meyers | 248/21 |
| 2,672,070 | 3/1954 | Forster | 85/32 CS |
| 2,775,281 | 12/1956 | Smith | 85/32 CS |
| 2,804,320 | 8/1957 | Pearson | 85/32 CS |
| 3,014,563 | 12/1961 | Bratton | 85/70 |

FOREIGN PATENTS OR APPLICATIONS

| | | | |
|---|---|---|---|
| 606,690 | 8/1948 | United Kingdom | 85/70 |
| 646,671 | 11/1950 | United Kingdom | |

*Primary Examiner*—Edward C. Allen
*Attorney, Agent, or Firm*—Milton E. Gilbert

[57] ABSTRACT

A fastener for securing structural members, the fastener comprising a resilient sleeve having an external flange at one end and internal screw-engaging means in the form of a helical wire coil partially embedded in said sleeve. The coil receives a screw which shortens and deforms the sleeve so that the sleeve can lockingly engage a structural member.

3 Claims, 11 Drawing Figures

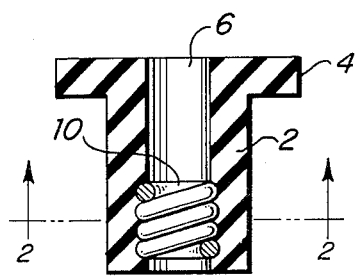
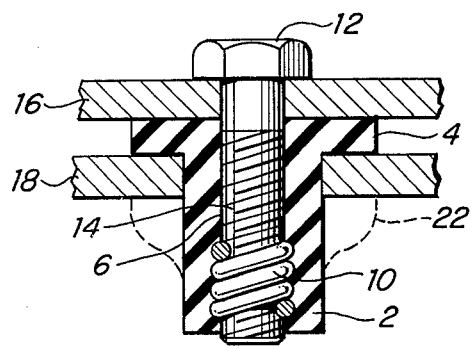
FIG. 1.  FIG. 3.
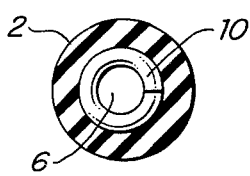
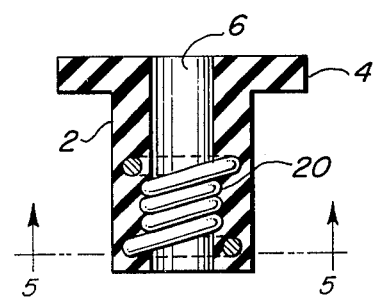
FIG. 2.  FIG. 4.
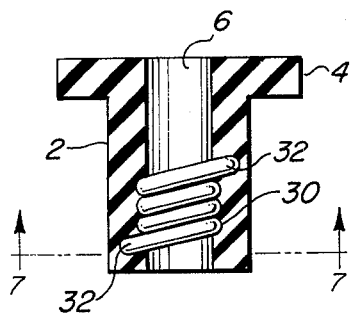
FIG. 6.
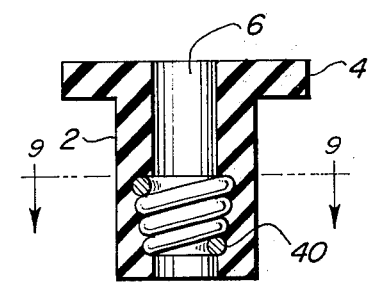
FIG. 5.
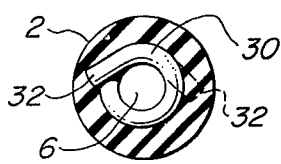
FIG. 7.
FIG. 8.
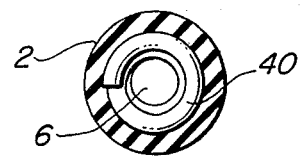
FIG. 9.

3,880,041

RESILIENT FASTENER

This invention relates to fastening devices and in particular to resilient deformable fastening devices that are adapted to be secured by cooperating threaded elements in apertures of structural members.

The prior art includes a number of different types of fasteners that comprise elastically deformable members for attaching an apertured member to an apertured structure. Two such types of fasteners are disclosed in U.S. Pat. No. 3449774 issued to L. F. Wilham and U.S. Pat. No. 3348444 issued to D. J. Brignola. The Wilham fastener utilizes a sleeve made of rubber or other elastomer and a nut fixed in a recess in one end of the sleeve. The sleeve and a spacer ring are disposed in an aperture of a first structural member and a screw mounted in an aperture of a second structural member is slipped into the spacer and sleeve and screwed into the nut. As the screw is rotated, it causes the nut to axially compress and thereby radially expand the sleeve so that the latter forms a circumferential flange that is too large to pass through the aperture in the second structural member, with the result that the two structural members are secured to one another. The Brignola fastener is similar to that of Wilham except that one end of the deformable sleeve has a flange and utilizes two nuts. Furthermore, the nuts are actually embedded in the sleeve at selected points between its ends. The Brignola device offers a distinct advantage over that of Wilham in that the flange serves to maintain the structural members in a cushioned, spaced relationship.

The fasteners in the prior art have a number of disadvantages. For one thing, the use of a nut increases the cost of manufacture. Secondly, if the sleeve is molded around the nut, the threads of the nut may become clogged with elastomer during the molding operation. This necessitates cleaning out the threads of the nut element by means of a tap. In such a situation, care must be taken in screwing in the tap to avoid damage to the threads of the nut element. In any event, this cleaning operation increases manufacturing costs. Thirdly, the nut element can become misaligned, e.g. tilted, when the sleeve is molded around it. A misaligned nut element may make the unit difficult to use or useless. If the nut is not molded in place but merely inserted in a preformed recess in the sleeve, there is real possibility of the nut being pulled out of the recess when it is being drawn up tight by the cooperating screw. Lastly, when using a threaded nut element, there is always a problem of lead-in, i.e. starting the engagement of the threads of the screw with the threads of the nut element.

Accordingly, an object of the present invention is to provide a simple, practical and economical fastening device which overcomes the aforementioned problems.

Another object of the present invention is to provide a novel fastening device in which a screw engaging element is assembled in an elastically deformable sleeve such that the element will not rotate when a torque is applied thereto by an engaging screw or bolt.

A further object of this invention is to provide a fastening device in which a screw engaging element is fixedly secured in an elastomeric sleeve in such a way that the element is locked against substantial axial movement relative to the sleeve.

Still another object of this invention is to provide a resilient fastening device which will effectively dampen high frequency noise and vibration.

Yet another object of the present invention is to provide a fastening device of the character described having an embedded screw engaging element that substantially eliminates alignment problems.

A more specific object of the present invention is to provide an economical fastener having a screw engaging element which is embedded in an elastomeric sleeve, the element being easily cleaned and shaped so as to facilitate lead-in of a screw or bolt.

The foregoing and other objects are achieved by an elastomeric body having an external flange and a bore extending at a right angle to the flange. A helical coil is disposed along the bore and partially embedded in the body so that several of its turns protrude into the bore. The axis of the coil is substantially aligned with the axis of the bore. In one embodiment, the turns of the coil are of uniform diameter. In a second embodiment both ends of the coil are flared, i.e. the turns at the ends of the coil are larger in diameter than other turns of the coil. In a third embodiment, the end turns of the coil are radially extended to form tangs that are fully embedded in the elastomer body. In a fourth embodiment, the coil is tapered, i.e. the diameter of the turns increases progressively from one end of the coil to the other. Other features and many of the attendant advantages of the invention are described or rendered obvious by the following detailed description which is to be considered together with the accompanying drawings wherein:

FIG. 1 shows a side elevational view, partly in section, of one embodiment of a fastening device embodying the features of the invention;

FIG. 2 is a cross-sectional view taken on line 2—2 of FIG. 1;

FIG. 3 shows a side elevation, partly in section, of fastening device like that of FIGS. 1 and 2 positioned in the apertures of two structural members;

FIG. 4 shows a side elevational view, partly in section, of another and preferred embodiment of the invention;

FIG. 5 is a sectional view taken on line 5—5 of FIG. 4;

FIG. 6 shows a side elevational view, partly in section, of a third embodiment of the invention;

FIG. 7 is a sectional view taken on line 7—7 of FIG. 6;

FIG. 8 shows a side elevational view, partly in section, of a fourth embodiment of this invention;

FIG. 9 is a sectional view taken on line 9—9 of FIG. 8, and

Figure 10:
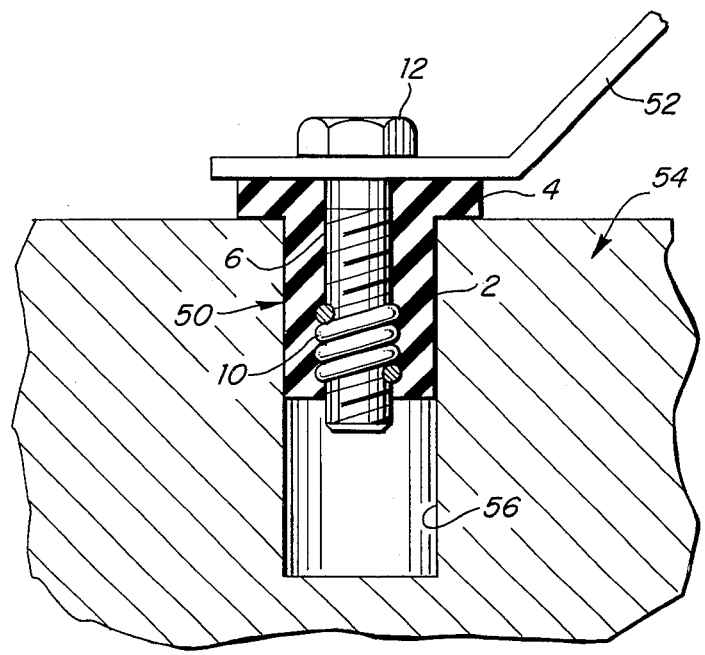
FIGS. 10 and 11 illustrate other uses of the invention.

Referring to the drawing wherein like numerals designate like parts, FIGS. 1, 4, 6 and 8 show a sleeve 2 having a peripheral flange 4 formed at one end. Sleeve 2 and flange 4 are preferably formed as a unitary element, and can be made of any of a wide variety of synthetic or natural elastomers, e.g. a neoprene or polyurethane rubber. A preferred material is a neoprene rubber. Sleeve 2 has a center bore 6 therethrough. In accordance with this invention, the sleeve is molded around a helical wire coil (see elements 10, 20, 30 and 40) with the axis of the coil being substantially aligned with the axis of bore 6 and with the turns embedded in the sleeve as hereinafter described. The wire may be coiled into several different shapes according to particular design considerations. At least two or three turns are necessary for the coil to serve as a screw or bolt engaging means as described hereinafter and also to secure it against axial or rotational movement relative to the sleeve.

The material and size of the wire of which the coil is formed may vary depending on design considerations. Good results have been found to occur where the wire is steel wire, although it will be obvious to one skilled in the art that the coil may be formed of other materials, e.g. other alloys.

By way of example, the coil is preformed by winding the wire about the threaded portion of a screw of approximate size as the screw to be used with the coil. The coil is then removed from the screw and may be primed for hot bonding. By way of example, a 30 mil wire can be wound about a 10–32 screw, the screw threads of which have a 0.187 inch major diameter. The resulting coiled wire can then be used to mate with threads of any other screw having a maximum allowable major diameter of 0.189 inches.

The sleeve is molded around the preformed and primed coil according to conventional techniques so that at least some of the turns are only partially embedded in the elastomer so that the inner portions of those turns may serve as screw or bolt engaging means. Although the fastener may be made so that the sleeve is under radial pressure by the coil, this is not necessary and in fact is not preferred. However, the coil is not merely embedded but also is bonded to the elastomer.

In the usual case, the sleeve can be molded around the coil with sufficient precision that the inner surface portions of those turns that are to serve as screw-engaging means are exposed and are free of elastomer. Preferably those turns are embedded to about half their cross-sections. However, should some small sections of elastomer cover those inner surface portions of the turns that should be exposed, they can be easily removed by inserting a rotating steel brush within the coil. The bristles of the brush will readily remove the undesired sections of elastomer.

Turning now to FIGS. 1 and 2, the coil 10 comprises a plurality of turns of uniform size with each turn being embedded in the surface of the sleeve defining the bore 6 so that about one half of the surface of each turn of the wire is exposed, i.e. the surface of the wire extending through about half of its cross-sectional circumference is exposed and the remainder is embedded. The turns of the coil are evenly spaced and preferably engage each other. The spacing of the turns is set according to the screw to be used in securing the fastening device.

FIG. 3 shows how a fastener like that of FIGS. 1 and 2 is employed to join together two structural members 16 and 18. The sleeve is inserted in an aperture in member 18 and a bolt 12 is inserted through an aperture in plate 16 into the bore 6 of the sleeve and is rotated so that its threads engage and mate with the turns of coil 10. The inner exposed portions of the turns of the coil coact to function as a screw thread. Since the coil is embedded in and bonded to the sleeve, it is locked against movement relative to the sleeve. Accordingly, as screw 12 is rotated, it will cause the coil to advance along its screw thread and this in turn will cause the sleeve to be contracted axially toward the member 18. As the sleeve shortens, it expands radially and thereby forms a flange-like bulge as shown by dotted lines 22 which bears against the adjacent surface of member 18 and thus prevents it from being pulled out of the aperture in that member and secures member 18 to member 16. The flange 4 is itself compressed between members 16 and 18 and thus provides a resilient cushion that effectively dampens vibration and noise at the structural joint interfaces of those members.

A second and preferred embodiment of the coil is shown in FIGS. 4 and 5. In this embodiment, coil 20 is disposed in sleeve 2 in the same manner as in the embodiments of FIGS. 1 and 2 but the diameters of its end turns are increased with respect to the diameters of its other turns. Preferably, the diameters of the end turns are such that at least about one-half to threequarters of the end turns are completely embedded in the sleeve 2. This has the advantage of increasing the axial holding strength as well as the resistance to rotation when a torque is applied. Also, the larger end turn at the upper end of the coil facilitates lead-in and engagement of the screw with the screw engaging portion of the coil.

A modification of the embodiment of FIGS. 1 and 2 is shown in FIGS. 6 and 7. Coil 30 is disposed in the same manner as coil 10 and has turns of uniform size but portions of its end turns are bent so as to form tangentially extending end portions or tangs 32 that are completely embedded in sleeve 2. This also provides increased holding strength.

The embodiment shown in FIGS. 8 and 9 has a tapered coil 40. Here coil 40 is disposed in the same manner as coil 10 but is made so that the diameter of the coil increases from one end to the other. The coil is disposed in the sleeve so that the end with the largest diameter turn is closest to flange 4. The smallest diameter turn is partially embedded in sleeve 2 like the turns of coil 10 and the largest diameter turn is substantially fully embedded in sleeve 2, i.e. none or little of the surface of the last turn is exposed. This embodiment is particularly useful when used with tapered sheet metal screws.

A fastener made in accordance with this invention has numerous advantages. It will support tensile loads as well as compressive loads. The screw can be inserted and removed from the sleeve without damage to either the sleeve or the wire coil. The fastener can be installed and removed without the need of special tools. Standard as well as machine screws can be used. The stiffness is not subject to variations in the fastener preload. The fastener can be installed without rear access and thus can be mounted in blind holes. It provides a good seal with only slight pressure and can be installed in more than one standard thickness material. The costs of the fastener are substantially reduced over prior art fasteners and the threaded coil and screw are not readily subject to stripping. Furthermore, it has been found to substantially reduce the transmission of noise and vibration. Another advantage concerns alignment. If the coil is not exactly aligned with the axis of sleeve 2, or if its turns are not exactly aligned with each other, engagement of screw 12 is still accomplished easily since the sleeve 2 will yield enough to allow the turns of the wire coil to be forced into alignment to the extent required to allow the screw to be secured into place. It is to be noted also that if the turns of the coil are suitably formed, they will tend to be expanded radially and also to some extent axially when the fastening screw is screwed into place. This expansion is opposed by the elastomer with the result that the screw will not loosen under shock or vibration. In this connection it is to be appreciated that the coil need not be made of wire of circular crosssection. Thus, for example, the wire may have a diamond shape in cross-section.

The foregoing devices also may be used to secure together two members where one member has a blind hole or a hole whose axial length is too long to permit the sleeve 2 to form a flange-like bulge as at 22 in FIG. 3. This application is illustrated in FIG. 10 where a resilient fastener 50 constructed as in FIG. 1 is used with a bolt 12 to secure a bracket 52 to a floor 54. Bracket 52 has a hole as shown for the shank of bolt 12 which is screwed into the wire coil 10. Although not shown, bracket 52 may be attached to or form part of a machine or other equipment. As shown, floor 54 has a blind hole 56 and a sleeve 2 extends into the hole far enough for its flange 4 to engage the floor. For this application, sleeve 2 and hole 56 are sized so as to make a relatively loose fit in the absence of bolt 12. When bolt 12 is screwed into the wire coil, it causes the sleeve to contract and thereby to expand radially into tight frictional engagement with the surrounding hole-defining surface of floor 54. By appropriately tightening bolt 12, the radially expanded portion of sleeve 2 will exert sufficient force on the surrounding hole-defining surface to lock bracket 52 to floor 54 and to maintain such connection under vibration and shock. Also the resilient flange 4 acts as a resilient cushion to dampen and reduce transmission of noise and vibration.

Figure 11:
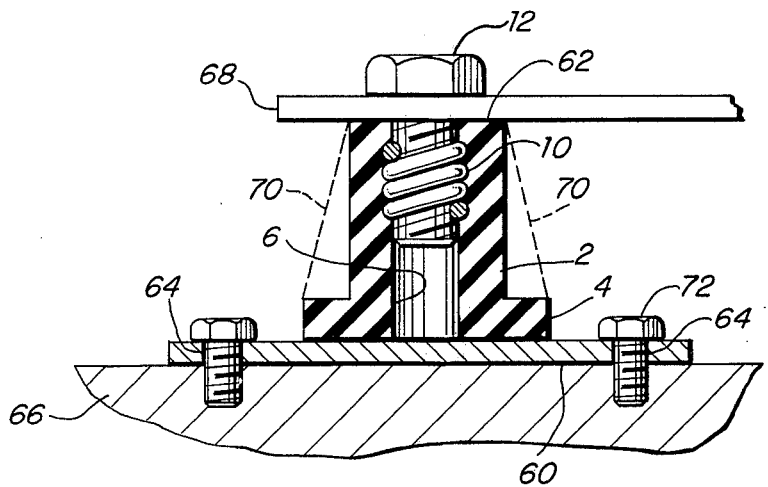

Fasteners made in accordance with the present invention also may be adapted for use as replacements for conventional elastomeric isolators for a wide variety of applications with vertically applied loads. Thus, for example, FIG. 11 illustrates how the device of FIG. 1 may be adapted to function as a vibration and shock controlling mount for machinery. In this case a relatively rigid mounting plate 60 is chemically bonded to the outer end surface of flange 4 of the device of FIG. 1.

The resulting isolator unit is installed so that the flat end surface 62 of sleeve 2 faces up and mounting plate 60 is provided with holes 64 for accommodating means such as screws 72 for securing it to a support such as a floor 66. The flat end surface 62 of sleeve 2 is engaged by a base plate 68 that forms part of or is affixed to the machine (not shown) which is to be supported. Base plate 68 has a hole to accommodate the shank of a bolt 12 which is inserted into sleeve 2 and screwed into coil 10. Bolt 12 is screwed in far enough for its head to clamp base plate 68 tight against the end surface of sleeve 2. The latter acts to attenuate noise, vibration and shock inputs. By appropriately modifying the dimensions of sleeve 2 and adjusting its durometer, it is possible to provide mounts for a wide load range. Of course, in this form of application, the exterior shape of the sleeve 2 may be modified, e.g. it need not have the flange 4 but instead may be tapered as shown in phantom by broken lines 70.

Since other obvious changes may be made in the illustrated embodiment of the device without departing from the scope of the invention, it is intended that all matter contained herein be interpreted as illustrative and not in a limiting sense.

What is claimed is:

1. A fastening device adapted for assembly with two structural members so as to reduce transmission of noise and mechanical vibrations at the interface of said members, said fastening device comprising a resilient sleeve for insertion into an aperture in one of said members, said sleeve having an interior surface defining a longitudinally extending bore, an exterior flange on said sleeve for engagement with said one member, and a screw-retaining means disposed within and secured to said sleeve for engagement by a screw inserted into said sleeve through an aperture in the other of said structural members, whereby rotation of said screw in said screw-retaining means will draw said members together and cause said sleeve to shorten and bulge outwardly into tight engagement with said one member, said sleeve being made of an elastomer and said screw-retaining means comprising a helical wire coil disposed coaxially with said bore and having a multiplicity of turns with the diameters of said turns increasing from one end of said coil to the opposite end of said coil, each of said turns comprising an outer peripheral portion and an inner peripheral portion, at least some of said turns having their outer peripheral portions embedded in and bonded to the body of said sleeve and their inner peripheral portions exposed and projecting into said bore, said exposed inner peripheral portions forming a screw thread for engagement by said screw.

2. A device according to claim 1 wherein the diameters of said turns increase with decreasing distance from said flange.

3. A fastening device comprising an elongate elastomer body with a longitudinally extending bore and an external flange at one end, and a screw-retaining means secured to said elastomer body for engagement by a screw inserted into said bore, said screw-retaining means comprising a helical wire coil that is disposed entirely between the opposite ends of said body in substantially coaxial relation with said bore, said coil extending along only a portion of the length of said body and being spaced from said flange, said coil comprising a relatively large diameter turn at each end thereof and at least one relatively small diameter turn intermediate said end turns, each of said end turns being fully embedded in and bonded to said elastomer body for at least about one half of the length of said each end turn, and said at least one intermediate turn comprising an outer peripheral portion and an inner peripheral portion, said outer peripheral portion being embedded in and bonded to said body, and said inner peripheral portion being exposed and projecting into said bore for engagement by said screw.

* * * * *